(12) United States Patent
Slawinski et al.

(10) Patent No.: US 6,267,350 B1
(45) Date of Patent: Jul. 31, 2001

(54) VALVE HAVING A MECHANISM FOR CONTROLLING A NONLINEAR FORCE

(75) Inventors: Tomasz Slawinski, Northbrook; Valeriy Kazak, Des Plaines, both of IL (US)

(73) Assignee: HydraForce, Inc., Lincolnshire, IL (US)

( * ) Notice: Subject to any disclaimer, the term of this patent is extended or adjusted under 35 U.S.C. 154(b) by 0 days.

(21) Appl. No.: 09/574,903

(22) Filed: May 19, 2000

Related U.S. Application Data
(60) Provisional application No. 60/134,778, filed on May 19, 1999.

(51) Int. Cl.[7] .................................................. F16K 31/06
(52) U.S. Cl. ........................................................ 251/64
(58) Field of Search .............................................. 251/64

(56) References Cited

U.S. PATENT DOCUMENTS

| | | | |
|---|---|---|---|
| 4,794,890 | * | 1/1989 | Richeson, Jr. ........................ 251/64 |
| 5,522,421 | * | 6/1996 | Holt et al. ....................... 137/505.22 |
| 6,021,999 | * | 2/2000 | English et al. ......................... 251/64 |

* cited by examiner

Primary Examiner—John Fox
(74) Attorney, Agent, or Firm—Leydig, Voit & Mayer, Ltd.

(57) ABSTRACT

A valve having a mechanism for stabilizing the flow of fluid, such as in response to a nonlinear force, is disclosed herein. According to an embodiment of the valve, a tube is anchored within a retainer, and a solenoid mounted on the tube. A pole piece is fixed within the tube, and an armature is slidably disposed within the tube adjacent to the pole piece. A generally frustoconical gap is defined between the pole piece and the armature. A flexible, non-magnetic washer is disposed within the conical gap. The flexible washer counteracts the effect of a non-linear magnetic force by providing a non-linear force in opposition. The result is that the flow of fluid though the valve as well as the valve pressure is stabilized, in contrast with the prior art.

38 Claims, 8 Drawing Sheets

VALVE HAVING A MECHANISM FOR CONTROLLING A NONLINEAR FORCE

CROSS REFERENCE TO RELATED APPLICATIONS

This application claims the benefit of U.S. Provisional Application No. 60/134,778 for an Electrically Controlled Valve having a Mechanism for Controlling a nonlinear force, filed May 19, 1999.

FIELD OF THE INVENTION

The present invention relates generally to valves and, more particularly, to a valve having a dampener for controlling a nonlinear force to stabilize the flow of fluid through the valve.

BACKGROUND OF THE INVENTION

Many conventional valves have problems with flow stability. For example, electronically controlled valves conventionally include a coil or solenoid that, when energized, creates a magnetic field. This magnetic field induces a magnetic attractive force between a fixed pole piece and a movable armature, causing the armature to move toward the pole piece, thereby unblocking an opening and allowing fluid to pass. However, because the attractive force between the armature and the pole piece increases exponentially as the distance between them decreases, the fluid pressure can become unstable. It is therefore desirable to provide a valve with improved stability.

SUMMARY OF THE INVENTION

In accordance with the foregoing, a valve having a mechanism for controlling a nonlinear force is disclosed herein. The inventive valve has a generally tubular housing, a movable piece, and a fixed piece. The movable piece and the fixed piece are disposed within the generally tubular housing adjacent to one another. The movable piece is movable along the axis of the generally tubular housing while the fixed piece is stationary. The generally tubular housing, movable piece and fixed piece may be embodied as a tube, an armature and a pole piece respectively. The moveable piece and the fixed piece each have an end surface. Each end surface may be of a variety of shapes, including, but not limited to, convex, concave, frustoconical, inverted frustoconical and annular.

A dampener is disposed between the fixed piece and the movable piece to stabilize the flow of fluid through the valve. Possible implementations of the dampener include, but are not limited to: a resilient member, such as a spring or flexible washer; a moldable material, such as rubber, foam, or plastic; and a liquid.

According to an embodiment of the valve, a tube is anchored within a retainer, and a solenoid mounted on the tube. A pole piece is fixed within the tube, and an armature is slidably disposed within the tube adjacent to the pole piece. A generally frustoconical gap is defined between the pole piece and the armature. A flexible, non-magnetic washer is disposed within the conical gap. The flexible washer counteracts the effect of a non-linear magnetic force by providing a non-linear force in opposition. The result is that the flow of fluid though the valve as well as the valve pressure is stabilized, in contrast with the prior art.

Accordingly, an advantage of the present invention is that it provides a novel valve having a mechanism for stabilizing the flow of fluid, such as by controlling a nonlinear force.

A more specific advantage of the present invention is that, when embodied as a solenoid controlled valve, it provides a mechanism for stabilizing changes in hydraulic pressure over a range of solenoid currents.

Other features and advantages of the invention are described in, and will be apparent from the following description and the annexed drawings.

DETAILED DESCRIPTION OF THE PREFERRED EMBODIMENT

Figure 1:
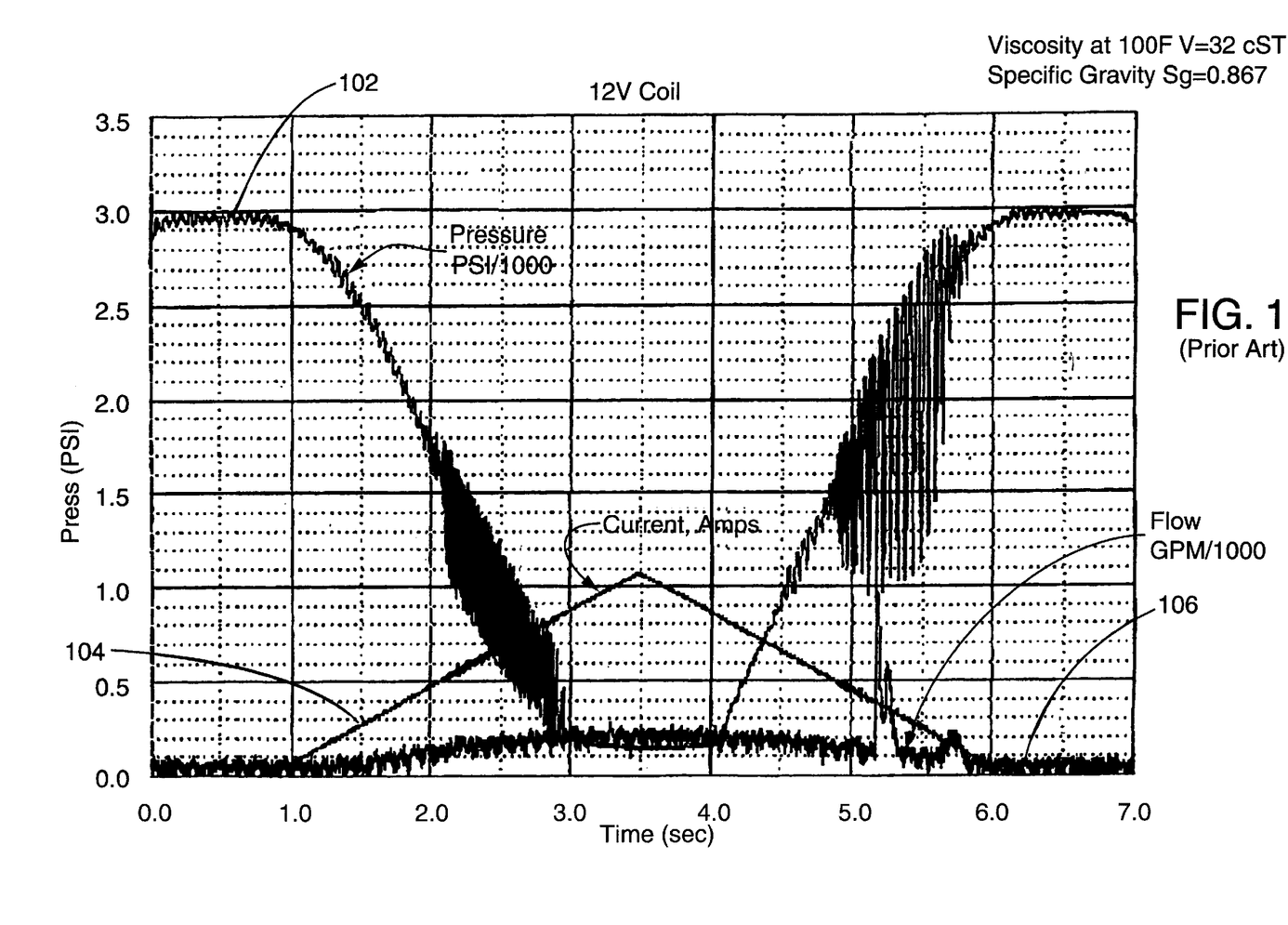
FIG. 1 is a graph showing plots of pressure, flow, and coil current versus time for a conventional valve.

Referring to FIG. 1, it can be seen from a plot 102 of pressure versus time, a plot 104 of coil current versus time, and a plot 106 of flow versus time for a conventional solenoid valve that the exponential increase in the attractive force between the pole piece and the armature causes instability in the pressure of the incoming fluid, particularly between time=2.0 seconds and time=3.0 seconds, as well as between time=4.5 seconds and time=5.8 seconds. It can therefore be seen that there is a need for an electrically controlled valve having a mechanism for controlling a nonlinear force.

Figure 2:
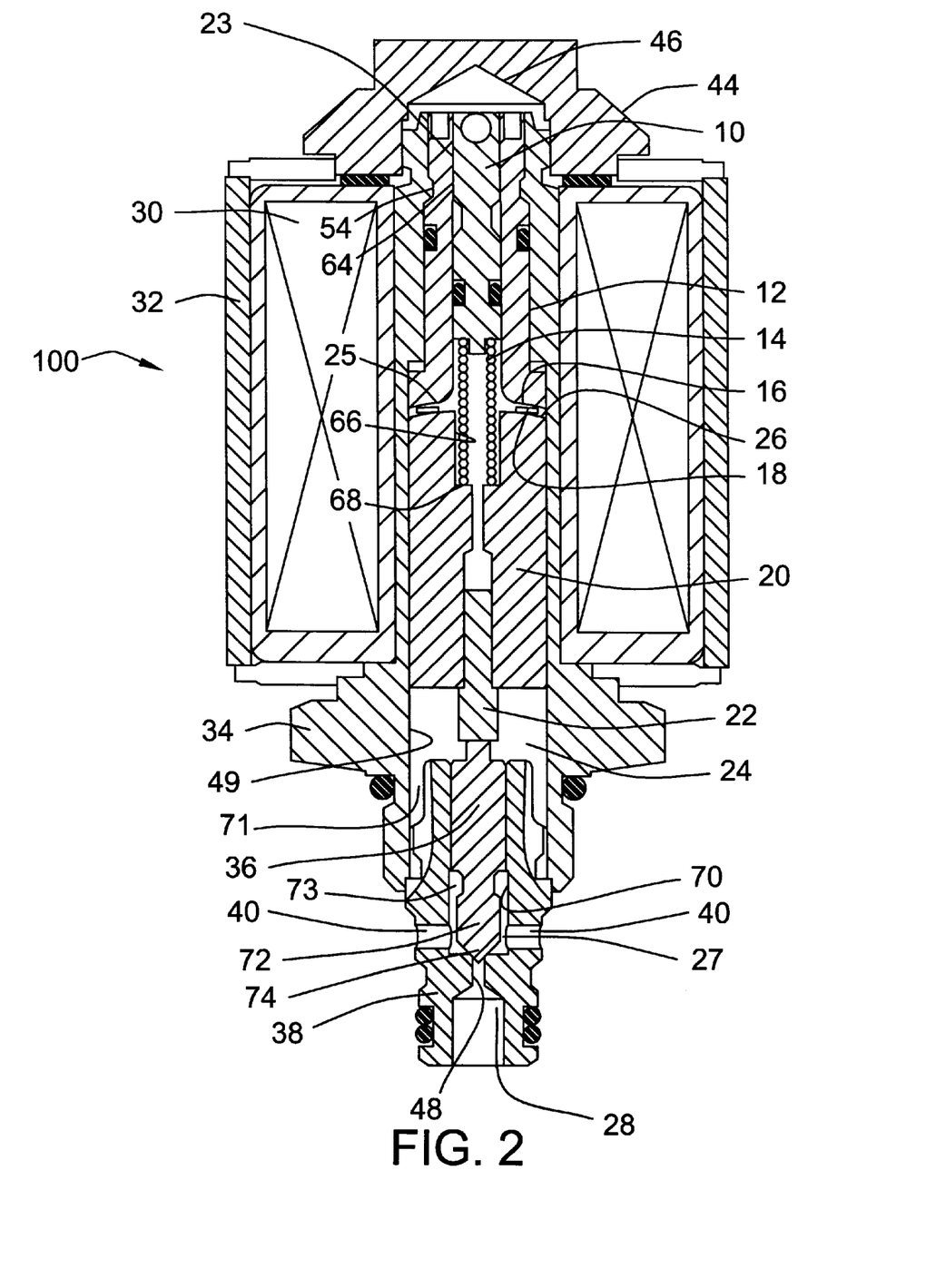
FIG. 2 is a cross-sectional view of an embodiment of a valve constructed in accordance with the teachings of the present invention.

Turning now to the drawings, a control valve constructed in accordance with an exemplary embodiment of the present invention is shown in FIG. 2 and is designated generally by reference numeral 100. In the illustrated embodiment, the control valve is in the closed position. The control valve 100 includes a retainer 44 having a generally cylindrical bore 46, and an actuator tube 34 having a generally cylindrical bore 49. The actuator tube 34 is fixed within the bore 46.

The valve 100 further includes a coil frame 32 containing a coil 30 and circumferentially mounted on the actuator tube 34, a housing 38, a pole piece 12, and an armature 20. The housing 38 is fixed within the bore 49, and has an input port 28, a generally cylindrical passageway 48, an internal passageway (not shown) communicatively linking points 71 and 73, an outlet channel or port 40, and a generally cylindrical bore 70. The pole piece 12 is fixed within the bore 49, has a generally cylindrical bore 23 and has a downwardly-facing surface 25 that is generally conical in shape.

The armature 20 is slidably disposed within the bore 49 of the actuator tube 34 adjacent to the pole piece 12. The armature 20 has a generally cylindrical bore 66, and an upwardly facing surface 26 that is generally conical in shape. The surface 25 and the surface 26 define a gap 16. A washer 18 is disposed in the gap 16. A spring 14 is disposed within bore 23. The spring 14 also extends into the bore 66 of the armature 20 and abuts the armature 20 to provide a downward force thereon. A spring adjuster 10 is seated within the bore 23 of the pole piece 12 to provide an anchor for the spring 14. The position and length of the spring adjuster 10 may be set during manufacture to vary the tension of the spring 14.

Figure 3:
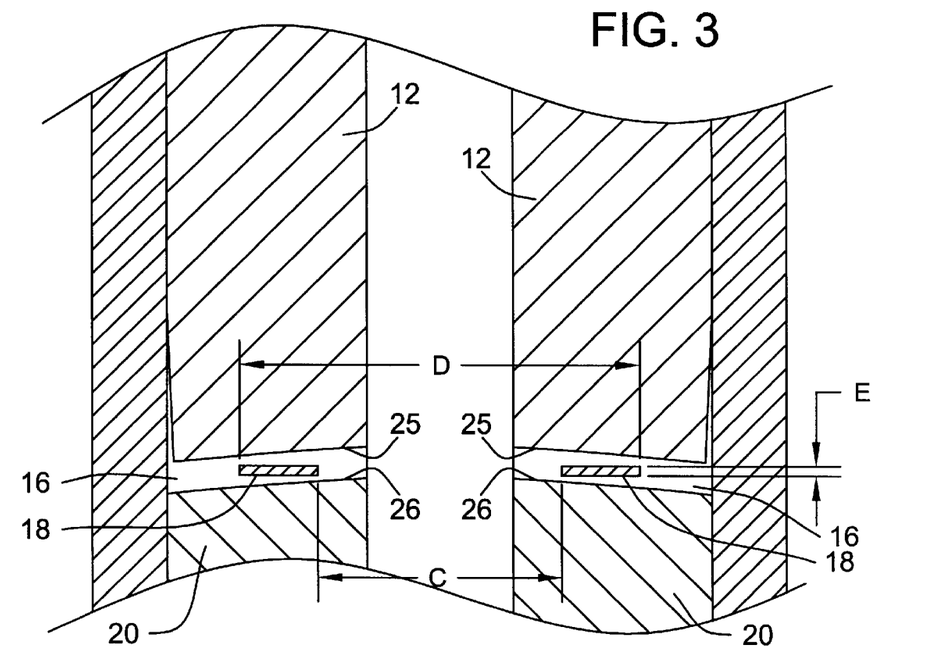
FIGS. 3 and 4 are close-up cross-sectional views of a novel feature of an embodiment of a valve constructed in accordance with the teachings of the present invention.
Figure 4:
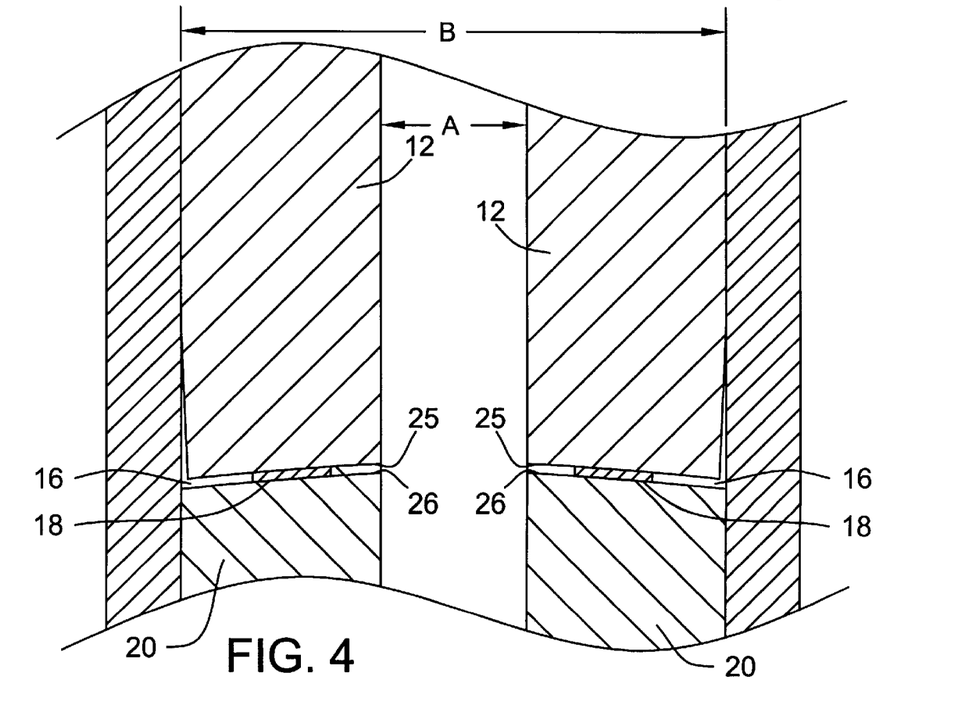
Figure 5:
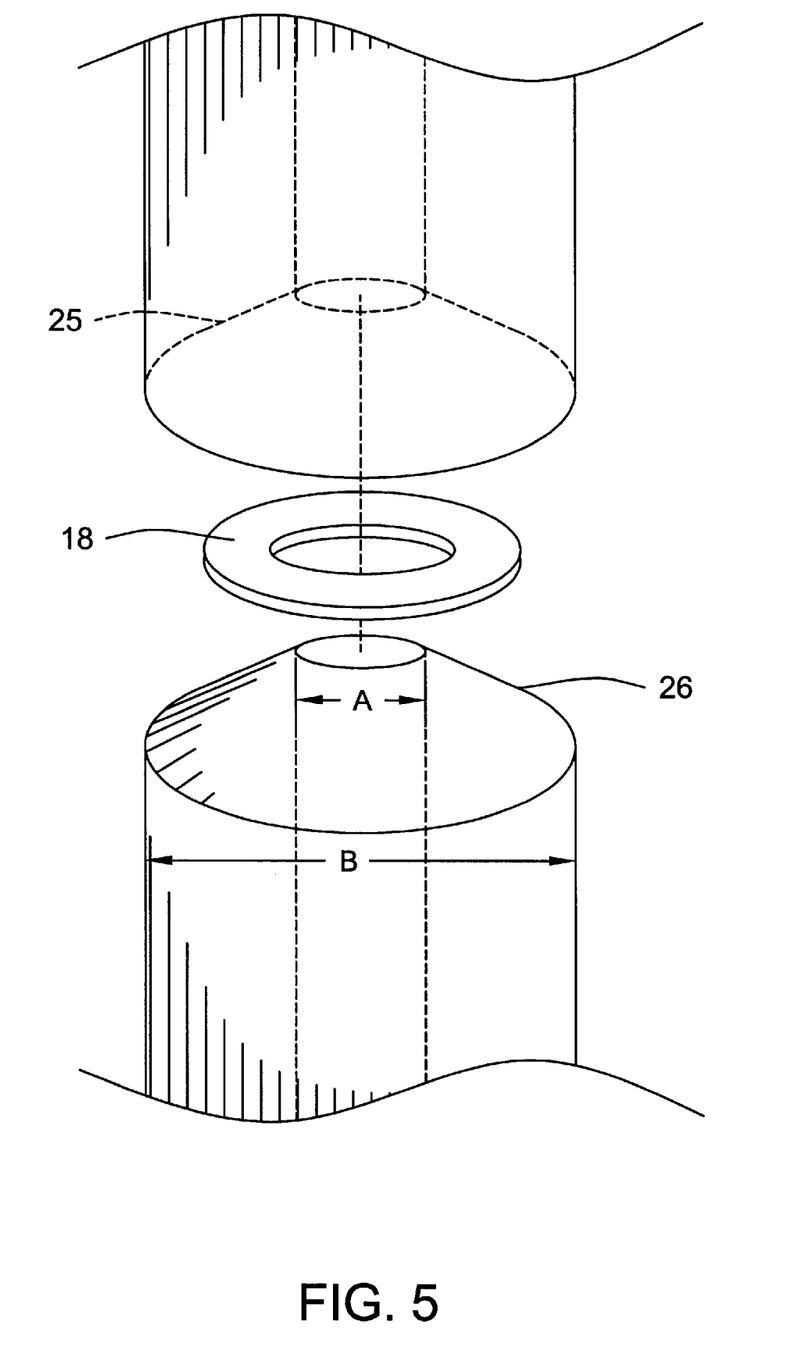
FIG. 5 is a close-up perspective view of a novel feature of an embodiment of a valve constructed in accordance with the-teachings of the present invention.

FIG. 3 shows the arrangement of the gap 16 and the washer 18 when the surfaces 25 and 26 are apart, while FIG. 4 shows their arrangement when the surfaces 25 and 26 are forced together during operation of the valve. When the surfaces are apart, the washer 18 may be supported by a piece passing through the washer hole (such as the spring 14), or it may be rest on one of the surfaces 25 and 26. FIG. 5 shows an exploded view of the gap 16 and its surrounding elements. For the sake of clarity, the spring 14 has been removed from FIGS. 3–5.

The gap 16 is of a generally frustoconical shape, and has an inner diameter A, an outer diameter B. The washer 18 has an inner diameter C, an outer diameter D, and a thickness E. The washer 18 is generally planar and may be made of a material that is both non-magnetic and flexible. While the gap 16 may have a variety of useful configurations, it is preferred that the surfaces 25 and 26 have a slope of from about 6 degrees to about 9 degrees. The tip of the frustoconical shape may be oriented toward the retainer 44, as shown in FIG. 2, but may alternatively be oriented toward the housing 38. The gap 16 and the washer 18 may be of a variety of sizes, but the following dimensions are known to be useful: A=0.190 inches (in.), B=0.515 in., C=0.258 in., D=0.515 in., and E=0.008 in. The washer 18 is preferably brass, but may be bronze, plastic, stainless steel, or any other non-magnetic material with spring-like characteristics.

Referring again to FIG. 2, the armature 20 has a rigid member 22 protruding from it. A valve member or poppet 36 is slidably disposed in the bore 70 and adjacent to the rigid member 22. The downward force of the spring 14 normally biases the armature 20 downward so that the rigid member 22 abuts the poppet 36. The poppet 36 has a head 72 with a circumference that is smaller than that of the bore 70. The head 72 has a tip 74 that is seated in the passageway 48 when the valve 100 is in a closed position. An upper chamber 24 is defined by the housing 38, the rigid member 22 and the poppet 36. A lower chamber 27 is defined by the head 72 of the poppet 36 and the wall of the bore 70. The lower chamber 27 communicates with the outlet port 40. The lower chamber 27 also communicates with the upper chamber 24 via a passageway (not shown) through the housing 38. When the valve 100 is in the open position, the passageway 48 provides communication between the lower chamber 26 and the port 28.

During operation, the outlet port 40 may be connected to a tank or low side of hydraulic pressure and the inlet port 28 may be connected to a source or high side of hydraulic pressure. When there is no current in the coil 30, tension in the spring 14 biases the armature 20 and the rigid member 22 to push against the poppet 36, causing a the poppet 36 to block the passageway 48 under normal conditions.

When a current is applied to the coil 30, a magnetic field is created that magnetizes the pole piece 12. If the current is sufficient, the resulting magnetic force causes the armature 20 to overcome the biasing force of the spring 14 and move toward the pole piece 12. The upward motion of the armature 20 causes the rigid member 22 to move up as well, thereby allowing pressure from fluid entering in the inlet port 28 to push the poppet 36 upward and allow the fluid to move from the inlet port 28 through the passageway 48, in the lower chamber 27, and out of the outlet port 40. As the upward magnetic force increases the armature 20 moves up further and allows a greater volume of fluid to exit the outlet port 40.

Figure 6:
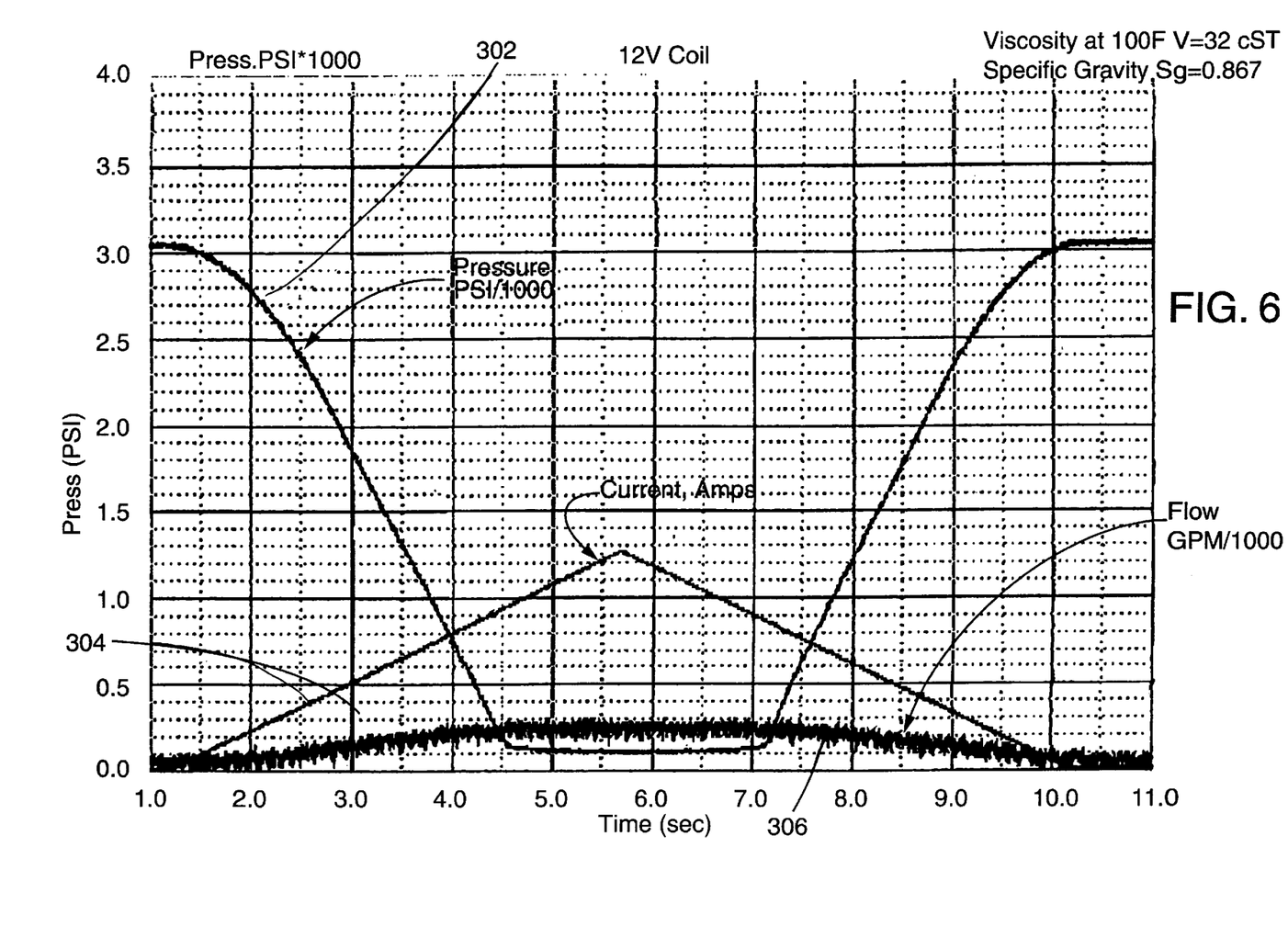
FIG. 6 is a graph showing plots of pressure, flow, and coil current versus time for an exemplary valve in accordance with the present invention.

The upward movement of the armature 20 also causes the surface 26 to move toward the surface 25, forcing the washer 18 against the surface 25 of the pole piece 12, and thereby causing the washer 18 to deform into a generally conical shape as shown in FIG. 4. Thus, the washer 18 acts as a magnetic separator between the armature 20 and the pole piece 12, and its deformation provides downward non-linear force that opposes the upward magnetic force. The rate of flow from the high side of hydraulic pressure at the port 28 to the low side at the port 40 will thus be a function of the sum of hydraulic force at the port 28, the hydraulic force at the port 40, the force of the spring 14, the magnetic force between the pole piece and the armature 20, and the force of the washer 18 as it resists deformation. The result is that the flow of fluid though the valve as well as the valve pressure is stabilized, in contrast with the prior art. This stability is illustrated in FIG. 6, which shows a plot 302 of pressure versus time, a plot 304 of coil current versus time, and a plot 306 of flow versus time.

Figure 7:
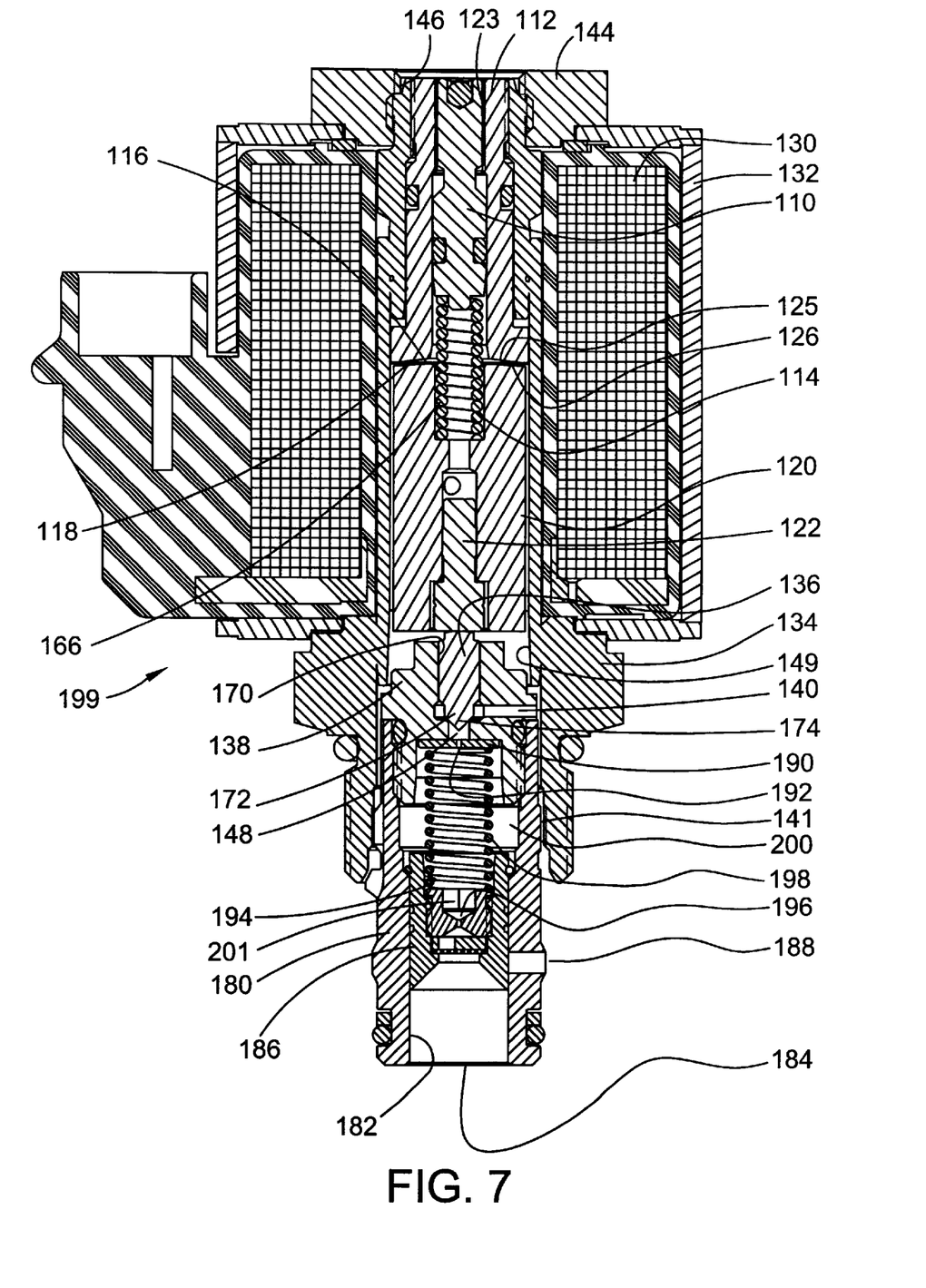
FIG. 7 is a cross-sectional view of-another embodiment of a valve constructed in accordance with the teachings of the present invention.

Referring to FIG. 7, another example of a control valve constructed in accordance with the teachings of the present invention is shown. The control valve, generally labeled 199, includes a retainer 144 having a generally cylindrical bore 146, and an actuator tube 134 having a generally cylindrical bore 149. The actuator tube 134 is fixed within the bore 146 of the retainer 144. The valve 199 further includes a coil frame 132 containing a coil 130 and circumferentially mounted on the actuator tube 134, an upper housing 138, a pole piece 112, and an armature 120. The upper housing 138 is fixed within the bore 149 of the tube 134, and has a generally cylindrical passageway 148, a generally cylindrical passageway or pilot tank connection 140, and a generally cylindrical bore 170. The pole piece 112 is fixed within the actuator tube bore 149, has a generally cylindrical bore 123 and has a downwardly-facing surface 125 that is generally conical in shape. A spring adjuster 110 is seated within the bore 123. A plate 190 having a pilot hole 192 is fixed at the opening of the passageway 148 so that the pilot hole 192 communicates with the passageway 148.

The armature 120 has a generally cylindrical bore 166, and an upwardly facing surface 126 that is generally conical in shape. The surface 125 and 126 define a gap 116. A washer 118 is disposed in the gap 116. A spring 114 is disposed within the pole piece bore 123. The spring 114 also extends into the bore 166 of the armature 120 and abuts the armature 120 to provide a downward force thereon. A spring adjuster 110 is seated within the bore 123 of the pole piece 112 to provide an anchor for the spring 114. The position and length of the spring adjuster 110 may be set during manufacture to vary the tension of the spring 114.

The gap 116 has a generally frustoconical shape and extends around the perimeter of the spring 114. The washer 118 has a hole, through which the spring 114 passes, and is generally planar. While the gap 116 may have a variety of useful configurations, it is preferred that the surfaces 125 and 126 have a slope of from about 6 degrees to about 9 degrees, with the tip of the frustoconical gap 116 oriented toward the retainer 144 and the base oriented toward the upper housing 138. The dimensions of the gap 116 and the washer 118 may vary, but the example measurements A, B, C, D and E described in FIGS. 3–5 for the gap 16 and the washer 18 may also be used in the valve 199 of FIG. 7. The washer 118 is preferably a non-magnetic material having spring-like characteristics, such as brass, bronze, plastic, or stainless steel.

Referring again to FIG. 7, a rigid member 122 protrudes from the armature 120. A control member or poppet 136 is slidably disposed in the bore 170 and abuts the rigid member 122. The poppet 136 has a head 172 with a circumference that is smaller than that of the bore 170. The head 172 has a tip 174 that is seated in the passageway 148 when the valve 199 is in a closed position.

The valve 199 further includes a lower housing 180 having a generally cylindrical bore 182, an inlet port 184 defined at the lower end of the bore 182, a discharge port 188, and a chamber 200. A spool 186 is slideably arranged in the bore 182. The spool 186 has a generally cylindrical bore 194, a chamber 201, and an orifice 196. A spring 198 is disposed in the chamber 200 with its upper end abutting the plate 190 and its lower end contacting the spool 186 in the bore 194. A passageway 141 is defined between the lower housing 180 and the actuator tube 134 and communicates with the pilot tank connection 140 and the discharge port 188.

Operation of the valve 199 will now be described. It is assumed that the valve 199 is initially in the closed position shown in FIG. 7. It is further assumed that there is initially no current in the coil 130 and that the inlet port 184 is connected to a source of pressurized fluid. The fluid first enters the inlet port 184. The fluid travels through the orifice 196 and into the chamber 201. The fluid then travels through the bore 194, through the pilot hole 192, and into the passageway 148. The pressure of the fluid exerts an upward force on the poppet head 174. If the pressure is sufficient to overcome the biasing force of the spring 114, the poppet 136 moves upward and pushes the rigid member 122 and armature 120 upward. As the tip 174 of the poppet 136 becomes unseated from the passageway 148, the flow of fluid is permitted to travel to the pilot tank connection 140, out the passageway 141 and to the discharge port 188. The upward movement of the armature 120 also causes the surface 126 to move toward the surface 125, forcing the washer 1 18 against the surface 125 of the pole piece 112, and thereby causing the washer 118 to deform into a generally conical shape as shown in FIG. 4. This flow, also referred to as the "pilot flow," causes the fluid pressure in the passageway 148 and the chamber 201 to drop below the fluid pressure at the inlet port 184. The resulting differential pressure across the spool 186 produces an upward force on the spool 186. When this upward force is sufficient to overcome the tension of the spring 198, the spool 186 moves upward until communication is established between the inlet port 184 and the discharge port 188.

When a current is applied to the coil 130, a magnetic field is created that magnetizes the pole piece 112. If the current is sufficient, the resulting magnetic force causes the armature 120 to overcome the biasing force of the spring 114 and move toward the pole piece 112. The upward motion of the armature 120 causes the rigid member 122 to move up as well, thereby allowing pressure from fluid entering in the pilot orifice 192 to push the poppet 136 upward and allow the fluid to move from the pilot orifice 192 through the passageway 148 and out of the pilot tank connection 140. As the upward magnetic force increases the armature 120 moves up further and allows a greater volume of fluid to exit the pilot tank connection 140.

The upward movement of the armature 120 also causes the surface 126 to move further toward the surface 125, forcing the washer 1 18 more closely against the surface 125 of the pole piece 112, and thereby causing the washer 118 to further deform as shown in FIG. 4. Thus, the washer 118 acts as a magnetic separator between the armature 120 and the pole piece 112, and its deformation provides downward non-linear force that opposes the upward magnetic force. Flow from the high side of hydraulic pressure may therefore be discharged to the low side with a rate controlled by the sum of the low pressure side hydraulic force, the high pressure side hydraulic force, the spring force, the magnetic force and the force of the washer. The result is that the flow of fluid though the valve as well as the valve pressure is stabilized, in contrast with the prior art.

Figure 8:
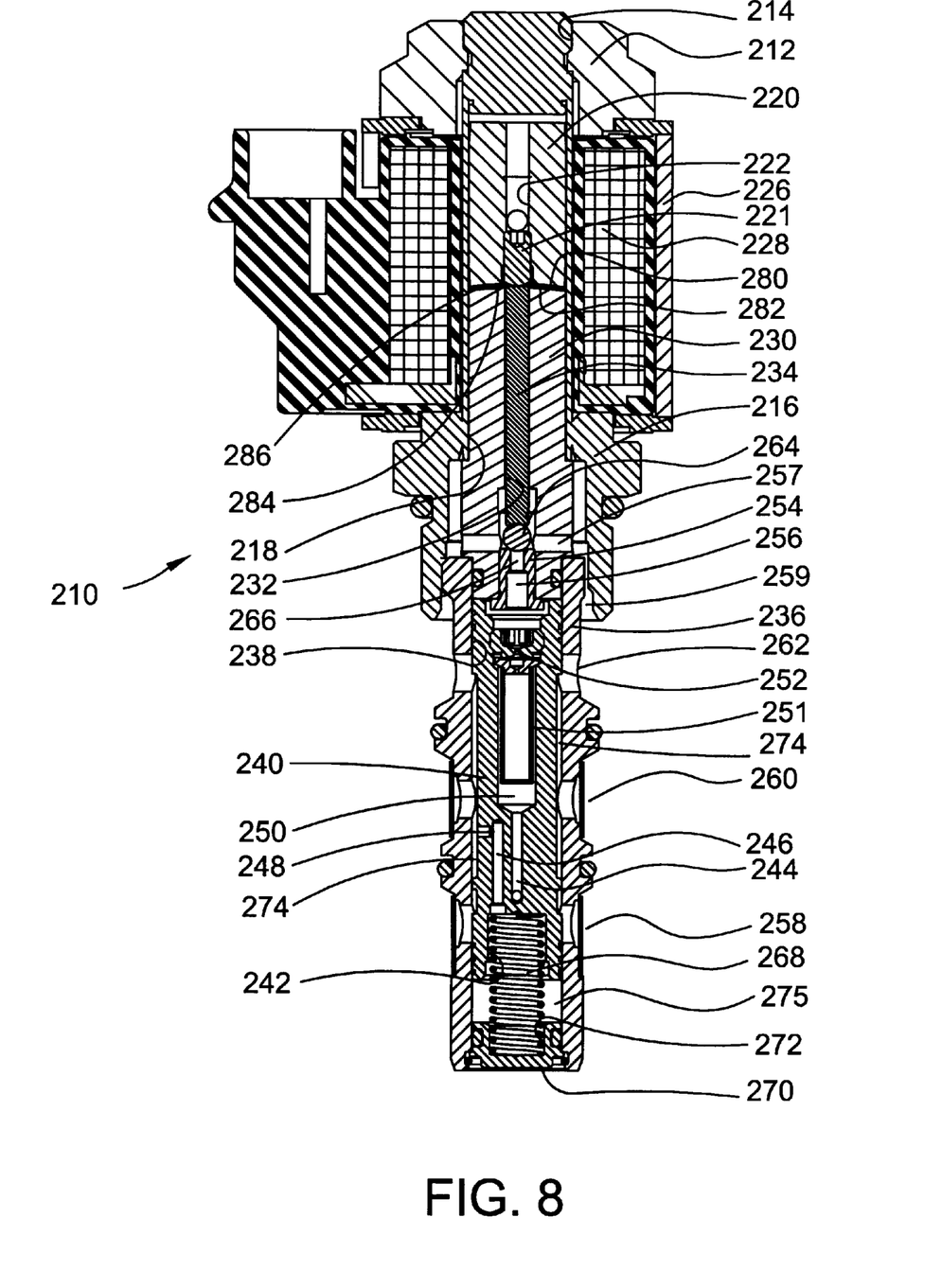
FIG. 8 is a cross-sectional view of still another embodiment of a valve constructed in accordance with the teachings of the present invention.

Referring to FIG. 8, another example of a control valve constructed in accordance with the teachings of the present invention is shown. The control valve 210 includes a retainer 212 having a generally cylindrical bore 214, a coil frame 226 containing a coil 228, an actuator tube 216 having a generally cylindrical bore 218, an armature 220 having a generally cylindrical bore 222, a pole piece 230 having a generally cylindrical bore 232, and a housing 236 having a generally cylindrical bore 238. The actuator tube 216 is fixed within the bore 214 of the retainer 212. The coil frame 226 is circumferentially mounted on the actuator tube 216. The armature 220 is slideably arranged within the bore 218 of the actuator tube 216, the pole piece 230 is fixed within the bore 218 adjacent to the armature 220, and the housing 236 is fixed within the bore 218 below the pole piece 230. A push pin 234 is slideably arranged within the bore 232 of the pole piece 230. A rigid member 221 is fixed within the bore 222 of the armature 220. The housing 236 also has a supply port 258, a control pressure port 260 and a tank port 262. A retaining cap 270 having a generally cylindrical bore 272 is attached to the lower end of the housing 236.

The armature 220 has a downwardly facing surface 280 that is generally conical in shape. The pole piece 230 has an upwardly facing surface 282 that is also generally conical in shape, and a passageway 257. A passageway 259 is defined between the housing 236 and the tube 216 and provides communication between the passageway 257 and the tank port 262. A gap 284 is defined by the surfaces 280 and 282. The gap 284 has a generally frustoconical shape. A washer 286 is disposed within the gap 284. The washer 286 is preferably non-magnetic and preferably has spring-like characteristics. When the armature moves down, the tip of the rigid member 221 enters the hole in the washer 286. The dimensions of the gap 284 and the washer 286 may vary, but the example measurements A, B, C, D and E described in FIGS. 3–5 for the gap 16 and the washer 18 may also be used in the valve 210 of FIG. 8. The washer 286 is preferably of a non-magnetic material having spring-like characteristics.

Referring again to FIG. 8, a spool 240 is slideably arranged within the bore 238. The outer surface of the spool 240 and the bore 238 of the housing 236 define a chamber 274. The spool 240 has a generally cylindrical bore 242, a pilot tube 244, a feedback tube 246, a feedback orifice 248 in communication with the feedback tube 246, a pilot orifice 252, and a chamber 250 in communication with the pilot tube 244 and the pilot orifice 252. A chamber 275 is defined by the housing 236, the spool 240, and the retaining cap 270. The chamber 275 communicates with the feedback tube 246. A pilot filter 251 is disposed within the chamber 250. A seat 254 having a chamber 256 and an orifice 266 is disposed within the bore 232 of the pole piece 230 above the spool 240.

The pilot tube 244 communicates with the inlet port 258 through a passageway (not shown) in the spool 240. The chamber 256 communicates with the pilot orifice 252 and the orifice 266. A valve member or ball 264 sits on top of the seat 254, and covers the orifice 266 when the valve is in the closed position.

A spring 268 is disposed within the bore 242 at its upper end, and within the bore 272 of the retaining cap 270 at its lower end. The tension in the spring 268 exerts an upward force on the spool 240, and in the absence of counteracting forces, causes the spool 240 to be in the position depicted in FIG. 8. This position allows the tank port 262 to communicate with the control pressure port 260 via the chamber 274, and blocks off the supply port 258 from the control pressure port 260.

The operation of the valve 210 will now be described. It is assumed that there is no current initially flowing through the coil 228. It is further assumed that the spool 240 is in the uppermost position, such that the control pressure port 260 communicates with the tank port 262 via the chamber 274. Finally, it is assumed that a source of pressurized fluid is connected to supply port 258, a clutch is connected to the control pressure port 260, and a tank is connected to the tank port 262.

Fluid from the supply port 258 flows through a passageway (not shown) in the spool 240 and to the pilot tube 244. The fluid then flows into the chamber 250, through the pilot filter 258, through the pilot orifice 252 and into the chamber 256. The pressure of the fluid pushes the ball 264, the push pin 234 and the armature 220 upward, causing the orifice 266 to become unblocked. Fluid then flows out of the chamber 256, through the passageway 257, the passageway 259 and to the tank port 262.

When current is applied to the coil 228, a magnetic field is created that magnetizes the armature 220 and the pole piece 230 and creates an attractive force between them. The armature 220 then moves toward the pole piece 230. This movement causes the washer 286 to deform into a conical shape between the surfaces 280 and 282. The strength of the washer 286 as it deforms creates an upward force that acts to dampen the movement of the armature 220. The rigid member 221 makes contact with the push pin 234 and pushes it downward. This downward force is transferred to the ball 264, which moves down to restrict the flow of fluid through the orifice 266. Consequently, the pressure of the fluid in the chamber 256 increases. The dampening effect of the washer 286 helps to ensure that this increase is stable. Once there is sufficient pressure in the chamber 256 to overcome the tension of the spring 268 and the pressure in the chamber 275, the spool 240 moves downward as a result of the pressure.

As the spool 240 moves down, the communication between the control pressure port 260 and the tank port 262 is closed off. As the spool 240 continues to move downward, communication between the control pressure port 260 and the supply port 258 is established. Fluid from the supply port 258 then flows to the control pressure port 260. Pressure at the control pressure port 260 is transferred to the chamber 275 via the feedback tube 246 and feedback orifice 248. Pressure in the chamber 274 and the chamber 275 grow until they equal the pressure in the chamber 256. When the pressure in the chamber 275 exceeds the pressure in the chamber 256, then the spool 240 is pushed upward until the communication between the supply port 258 and the chamber 274 is cut off. When the current to the coil 228 is decreased, then the spool 240 moves up, thereby allowing communication between the control pressure port 260 and the tank port 262 through the chamber 274. This relieves the pressure at the control pressure port 260.

Figure 9:
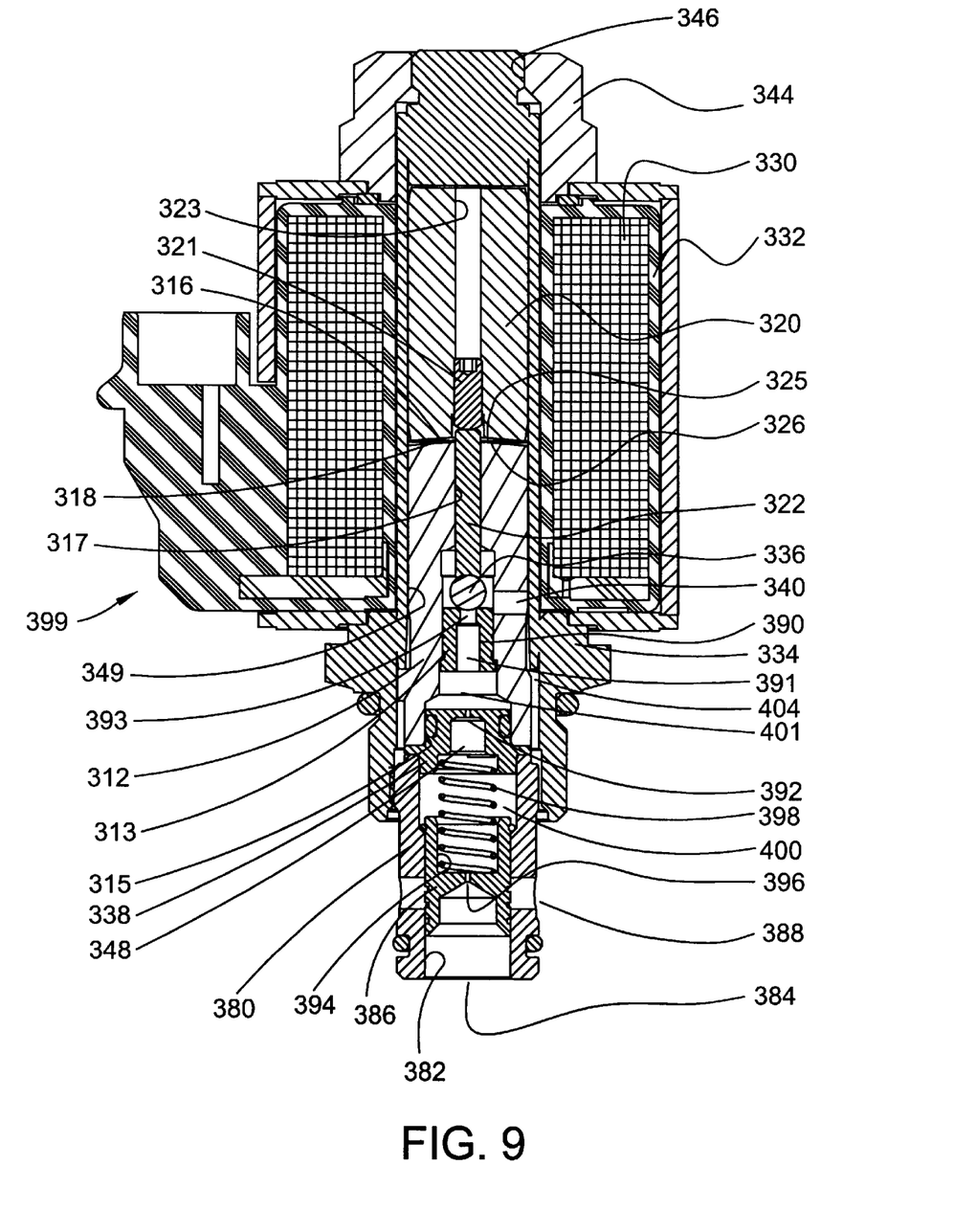
FIG. 9 is a cross-sectional view of still another embodiment of a valve constructed in accordance with the teachings of the present invention.

Referring to FIG. 9, yet another example of a control valve constructed in accordance with the teachings of the present invention is shown. The control valve 399 includes retainer 344 having a generally cylindrical bore 346, and an actuator tube 334 having a generally cylindrical bore 349. The actuator tube 334 is fixed within the bore 346. The valve 399 further includes a coil frame 332 containing a coil 330 and circumferentially mounted on the actuator tube 334; an upper housing 338; a pole piece 312 having generally cylindrical bore sections 313, 315 and 317; and an armature 320. The upper housing 338 is fixed within the bore section 315, and has a generally cylindrical passageway 348 and a pilot hole 392. A seat 390 having a chamber 391 and an orifice 393 is fixed within the bore section 313 of the pole piece 312. A valve member or ball 336 sits on top of the orifice 393 and blocks the orifice 393 when the valve 399 is in the closed position. The armature 320 is slidably disposed within the actuator tube bore 349, has a generally cylindrical bore 323 and has a downwardly-facing surface 325 that is generally conical in shape. A rigid member 321 is fixed within the bore 323 of the armature 320. The armature 320 may further include a spring (not shown).

The pole piece 312 is fixed within the bore 349 of the actuator tube 334 adjacent to the armature 320. A push pin 322 is slidably disposed within the bore section 317. The pole piece 312 has an upwardly facing surface 326 that is generally conical in shape, and a passageway 340. A passageway 404 is defined between the pole piece 312 and the tube 334, providing communication between the passageway 340 and the discharge port 388.

A gap 316 is defined by the surfaces 325 and 326 of the pole piece 312 and the armature 320 respectively. The gap 316 has a generally frustoconical shape. A flexible, non-magnetic washer 318 is disposed within the gap 316. The washer 318 has a hole in its center, and is generally planar. While the gap 316 may have a variety of useful configurations, it is preferred that the surfaces 325 and 326 have a slope of from about 6 degrees to about 9 degrees, with the tip of the frustoconical gap 316 oriented toward the retainer 344 and the base oriented toward the upper housing 338. The dimensions of the gap 316 and the washer 318 may vary, but the example measurements A, B, C, D and E described in FIGS. 3–5 for the gap 16 and the washer 18 may also be used in the valve 399 of FIG. 9. The washer 318 is preferably of a non-magnetic material having spring-like characteristics.

Referring again to FIG. 9, the valve 399 further includes a lower housing 380 having a generally cylindrical bore 382, an inlet port 384, a discharge port 388, and a chamber 400. A spool 386 is slideably arranged in the bore 382. The spool 386 has a generally cylindrical bore 394, and an orifice 396. A spring 398 is disposed in the chamber 400 with its upper end abutting the mouth of the chamber 348 and its lower end contacting the spool 386 in the bore 394. A chamber 401 is defined by the upper housing 338, the pole piece 312 and the seat 390.

Operation of the valve 399 will now be described. It is assumed that the valve 399 is initially in the closed position shown in FIG. 9. It is further assumed that there is initially no current in the coil 330 and that the inlet port 384 is connected to a source of pressurized fluid. The fluid first enters the inlet port 384. The fluid then travels through the orifice 396, the bore 194, the passageway 348, the pilot hole 392, and into the chamber 401. The pressure of the fluid forces the ball 336 upward, pushing the pin 322, the rigid member 321 and the armature 320 upward as well. The fluid travels through the passageway 340, the passageway 404 and out of the discharge port 388. This flow, also referred to as the "pilot flow," causes the fluid pressure in the chamber 401 and in the chamber 400 to drop below the fluid pressure at the inlet port 384. The resulting differential pressure across the spool 386 produces an upward force on the spool 386. When this upward force is sufficient to overcome the tension of the spring 398, the spool 386 moves upward until communication is established between the inlet port 384 and the discharge port 388.

When current is applied to the coil 330, a magnetic field is created that magnetizes the armature 320 and the pole piece 312 and creates an attractive force between them. The armature 320 then moves toward the pole piece 312. This movement causes the washer 318 to deform into a conical shape between the surfaces 325 and 326. The strength of the washer 318 as it deforms creates an upward force that acts to dampen the movement of the armature 320. The rigid member 321 makes contact with the push pin 322 and pushes it downward. This downward force is transferred to the ball 336, which moves down to restrict the flow of fluid through the orifice 393. Consequently, the pressure of the fluid in the chambers 391, 401 and 348 increases. The dampening effect of the washer 318 helps to ensure that this increase is stable. Once there is sufficient pressure in the chamber 400, the tension of the spring 398 moves the spool 386 moves downward as a result of the pressure. As the spool 386 moves down, the communication between the discharge port 388 and the inlet port 384 is closed off.

It can be seen from the foregoing that a new and useful valve having a mechanism for controlling a nonlinear force has been described. The embodiments of the valve described herein may be used to the control the flow of a variety of fluids, including oil and hydraulic fluid.

In view of the many possible embodiments to which the principals of this invention may be applied, it should be recognized that the embodiments described herein with respect to the drawing figures are meant to be illustrative only and should not be taken as limiting the scope of the invention. The illustrated embodiments can be modified in arrangement and detail without departing from the spirit of the invention. Therefore, the invention as described herein contemplates all such embodiments as may come within the scope of the following claims and equivalents thereof.

We claim:

1. A valve comprising:
   a generally tubular housing;
   a movable piece having a first end surface, the movable piece being disposed within the tubular housing and movable along an axis of the tubular housing to increase or decrease the flow of fluid through the valve;
   a fixed piece having a second end surface, the fixed piece being disposed within the tubular housing adjacent to the movable piece so that the first and second surfaces face one another; and
   a dampener disposed between the first and second surfaces for dampening the movement of the movable piece relative to the fixed piece to stabilize a flow of fluid through the valve.

2. The valve of claim 1, wherein the fixed piece and movable piece are closest to each other at said end surfaces.

3. The valve of claim 1, wherein the movable piece is generally cylindrical and the first end surface extends in a generally radial direction from a periphery of the movable piece.

4. The valve of claim 1, wherein the fixed piece is generally cylindrical and the second end surface extends in a generally radial direction from a periphery of the fixed piece.

5. The valve of claim 1, wherein one of the end surfaces is concave and the other end surface is convex.

6. The valve of claim 1, wherein one of the end surfaces is of a frustoconical shape and the other end surface is of an inverted frustoconical shape.

7. The valve of claim 1, wherein the dampener has a generally planar and annular shape.

8. The valve of claim 7, wherein, in a normal position, a center diameter of the dampener contacts one of the end surfaces and an outer periphery of the dampener contacts the other end surface.

9. The valve of claim 1, wherein the dampener is resilient and deflects into a conical shape in response to the movement of the movable piece relative to the fixed piece.

10. The valve of claim 1,
    wherein one of the end surfaces is concave and the other end surface is convex,
    wherein a gap is defined between the end surfaces,
    wherein the dampener has a first surface, a second surface oppositely directed relative to the first surface, a circular outer edge, and a central circular opening defined by the circular inner edge, and
    wherein the dampener is disposed within the gap to bias the movable piece away from the fixed piece, the dampener being deflectable between a normal position in which the outer diameter contacts the concave end surface and a fully deflected position in which the first surface is in flush contact with the concave surface and the second surface is in flush contact with the convex surface.

11. The valve of claim 1, further comprising:
    a lower housing disposed within the tubular housing, the lower housing having a bore, a first port and a second port; and
    a spool slidably disposed within the bore of the lower housing for movement in response to a fluid pressure differential on either side of spool to vary a flow of fluid between the first and second port.

12. A valve comprising:
    a generally tubular housing;
    a movable piece disposed within the tubular housing and movable along an axis of the tubular housing to increase or decrease the flow of fluid through the valve, the movable piece having an axial bore extending at least partially therethrough, the movable piece having a first end surface concentric around an opening to the axial bore;
    a fixed piece disposed within the tubular housing, the fixed piece having an axial bore extending at least partially therethrough, the fixed piece having a second end surface concentric around an opening to the axial bore, the fixed piece being adjacent to the movable piece so that the first and second end surfaces face one another;
    a resilient member disposed within the axial bores for biasing the movable and the fixed piece away from each other; and a dampener positioned between the end surfaces to dampen the movement of the movable piece relative to the fixed piece, thereby stabilizing a flow of fluid through the valve.

13. The valve of claim 12, wherein one of the end surfaces is concave and the other end surface is convex.

14. The valve of claim 12, wherein one of the end surfaces is of a frustoconical shape and the other surface is of an inverted frustoconical shape.

15. The valve of claim 12, wherein the dampener has a generally planar and annular shape.

16. The valve of claim 15, wherein, in a normal position, a center diameter of the dampener contacts the end surface of the movable piece and an outer periphery of the dampener contacts an end surface of the fixed piece.

17. The valve of claim 12, wherein the dampener is resilient and deflects into a conical shape in response to the movement of the movable piece relative to the fixed piece.

18. The valve of claim 12, wherein one of the end surfaces is concave and the other end surface is convex, wherein a gap is defined between the end surfaces, wherein the dampener has a first surface, a second surface oppositely directed relative to the first surface, a circular outer edge, and a central circular opening defined by the circular inner edge, and wherein the dampener is disposed within the gap to bias the movable piece away from the fixed piece, the dampener being deflectable between a normal position in which the outer diameter contacts the concave end surface and a fully deflected position in which the first surface is in flush contact with the concave surface and the second surface is in flush contact with the convex surface.

19. A valve comprising:

a generally tubular housing;

a movable piece disposed within the tubular housing and movable along an axis of the tubular housing to increase or decrease the flow of fluid through the valve, the movable piece having an axial bore extending at least partially therethrough, the movable piece having a first end surface concentric around the axial bore;

a rigid member fixed within the axial bore of the movable piece;

a fixed piece disposed within the tubular housing, the fixed piece having an axial bore extending at least partially therethrough, the fixed piece having a second end surface concentric around the axial bore, the fixed piece being adjacent to the movable piece so that the first and second end surfaces faced one another;

a sliding member slidably disposed within the axial bore of the fixed piece and adjacent to the rigid member; and a dampener positioned concentrically around the axial bores between the end surfaces to dampen the movement of the movable piece relative to the fixed piece, thereby stabilizing a flow of fluid through the valve.

20. The valve of claim 19, wherein one of the end surfaces is concave and the other surface is convex.

21. The valve of claim 19, wherein one of the end surfaces is of a frustoconical shape and the other end surface is on an inverted frustoconical shape.

22. The valve of claim 19, wherein the dampener is generally planar and annular.

23. The valve of claim 22, wherein, in a normal position, a center diameter of the dampener contacts one of the end surfaces and an outer periphery of the dampener contacts the other end surface.

24. The valve of claim 19, wherein the dampener is resilient and deflects into a conical shape in response to the movement of the movable piece relative to the fixed piece.

25. The valve of claim 19, wherein one of the end surfaces is concave and the other end surface is convex, wherein a gap is defined between the end surfaces, wherein the dampener has a first surface, a second surface oppositely directed relative to the first surface, a circular outer edge, and a central circular opening defined by the circular inner edge, and wherein the dampener is disposed within the gap to bias the movable piece away from the fixed piece, the dampener being deflectable between a normal position in which the outer diameter contacts the concave end surface and a fully deflected position in which the first surface is in flush contact with the concave surface and the second surface is in flush contact with the convex surface.

26. A valve comprising:

a generally tubular housing;

an movable piece disposed within the tubular housing and movable along an axis of the tubular housing to vary a flow of fluid through the valve, the movable piece having an annular, non-planar end surface;

a fixed piece having an annular, non-planar end surface and disposed within the tubular housing adjacent to the movable piece so that the end surfaces face each other and are spaced from each other to define a gap therebetween; and a dampener disposed within the gap against the end surfaces for dampening the movement of the movable piece relative to the fixed piece to stabilize a flow of fluid through the valve.

27. The valve of claim 26, wherein the end surface of the fixed piece is generally frustoconical.

28. The valve of claim 26, wherein the end surface of the fixed piece has a slope of from about 6 degrees to about 9 degrees.

29. The valve of claim 27, wherein the end surface of the fixed piece is generally curved.

30. The valve of claim 26, wherein the end surface of the moveable piece is generally frustoconical.

31. The valve of claim 26, wherein the end surface of the movable piece has a slope of from about 6 degrees to about 9 degrees.

32. The valve of claim 31, wherein the end surface of the movable piece is generally curved.

33. The valve of claim 26, wherein one of the end surfaces is concave and the other end surface is convex.

34. The valve of claim 26, wherein the dampener is resilient and deflects into a conical shape in response to the movement of the movable piece relative to the fixed piece.

35. The valve of claim 26, wherein the dampener is generally planar and annular.

36. The valve of claim 35, wherein, in a normal position, a center diameter of the dampener contacts one of the end surfaces and an outer periphery of the dampener contacts the other end surface.

37. The valve of claim 26, wherein one of the end surfaces is concave and the other end surface is convex, wherein the dampener has a first surface, a second surface oppositely directed relative to the first surface, a circular outer edge, and a central circular opening defined by the circular inner edge, and wherein dampener is disposed within the gap to bias the movable piece away from the fixed piece, the dampener being deflectable between a normal position in which the outer diameter contacts the concave end surface and a fully deflected position in which the first surface is in flush contact with the concave surface and the second surface is in flush contact with the convex surface.

38. The valve of claim 26, further comprising:

a valve member disposed within the tubular housing to vary the flow of fluid through the valve, wherein, in a normal condition, the movable piece is biased to abut the valve member to block a flow of fluid.

* * * * *